(12) United States Patent
DeFilippis

(10) Patent No.: US 7,081,310 B2
(45) Date of Patent: Jul. 25, 2006

(54) BIPOLAR PLATE HAVING INTEGRATED GAS-PERMEABLE MEMBRANE

(75) Inventor: Michael S. DeFilippis, Delmar, NY (US)

(73) Assignee: MTI Microfuel Cells, Inc., Albany, NY (US)

( * ) Notice: Subject to any disclaimer, the term of this patent is extended or adjusted under 35 U.S.C. 154(b) by 173 days.

(21) Appl. No.: 10/384,095

(22) Filed: Mar. 6, 2003

(65) Prior Publication Data
US 2004/0028984 A1    Feb. 12, 2004

Related U.S. Application Data

(60) Provisional application No. 60/362,360, filed on Mar. 6, 2002.

(51) Int. Cl.
H01M 8/00 (2006.01)

(52) U.S. Cl. ....................................................... 429/13

(58) Field of Classification Search .................. 429/34, 429/38, 32, 13
See application file for complete search history.

(56) References Cited

U.S. PATENT DOCUMENTS 3,847,672 A    11/1974   Trocciola et al. ............. 136/86
4,612,261 A *  9/1986   Tsukui et al. .................. 429/13

FOREIGN PATENT DOCUMENTS

| EP | 0 344 219 B1 | 12/1989 |
| EP | 0 427 897 A1 | 5/1991 |
| JP | 58 035875 A | 3/1983 |

OTHER PUBLICATIONS

International Search Report dated Nov. 19, 2004 corresponding to PCT/US03/07397.

* cited by examiner

Primary Examiner—Patrick Joseph Ryan
Assistant Examiner—Thomas H. Parsons
(74) Attorney, Agent, or Firm—Mintz Levin Cohn Ferris Glovsky and Popeo P.C.

(57) ABSTRACT

The present invention is directed to a novel anode plate forming an anode chamber of a fuel cell. The anode plate includes an anode fuel flow field, a substantially gas permeable membrane, and a channel coupled to an outlet positioned immediately adjacent the membrane. The channel directs gaseous effluents produced in the anode chamber out of the fuel cell via the outlet. This novel anode plate may be used in a single fuel cell, electrically and mechanically coupled to a cathode plate in a multi-fuel cell arrangement, or combined with a cathode plate producing a bi-polar plate for a fuel cell stack. Alternatively, the features of the anode plate and cathode plate may be integrated into a single component, thus improving performance and limiting the size of a stack and system implementing the stack.

3 Claims, 3 Drawing Sheets

FUEL CELL 1  FUEL CELL 2

BIPOLAR PLATE HAVING INTEGRATED GAS-PERMEABLE MEMBRANE

CLAIM TO PRIORITY

The present invention claims priority under 35 U.S.C. §119(e) of U.S. Provisional Patent Application No. 60/362,360, filed Mar. 6, 2002, the entire disclosure of which is herein incorporated by reference.

BACKGROUND OF THE INVENTION

1. Field of the Invention

The present invention provides a direct feed fuel cell for producing electrical energy by electrochemical oxidation/reduction of an organic fuel, and in particular to a direct feed methanol fuel cell system with integrated gas separation.

2. The Prior Art

Fuel cells are devices in which an electrochemical reaction is used to generate electricity. A variety of materials may be suitable for use as a fuel depending upon the materials chosen for the components of the cell and the intended application for which the fuel cell will provide electric power.

Fuel cell systems that utilize carbonaceous fuels may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most stationary fuel cells are reformer-based fuel cell systems. However, because fuel processing is expensive and requires significant volume, reformer-based systems are presently limited to comparatively high power applications. Because of their ability to provide sustained electrical energy, fuel cells have increasingly been considered as a power source for smaller devices including consumer electronics such as portable computers and mobile phones. Accordingly, designs for both reformer based and direct oxidation fuel cells have been investigated for use in portable electronic devices. Reformer based systems are not generally considered a viable power source for small devices due in part to the size, expense, and technical complexity of present fuel reformers.

Thus, significant research has focused on designing direct oxidation fuel cell systems for small applications, and in particular, direct systems using carbonaceous fuels including but not limited to methanol, ethanol and aqueous solutions thereof. One example of a direct oxidation fuel cell system is a direct methanol fuel cell system. There are several reasons why a direct methanol fuel cell (DMFC) power system is advantageous for providing power for smaller applications. First, methanol has a high energy content, thus providing a compact means of storing energy. In addition, methanol can be stored and handled with relative ease, and because the reactions necessary to generate electricity in an DMFC system occur under ambient conditions.

DMFC power systems are also particularly advantageous since they are environmentally friendly. The chemical reaction in a DMFC power system yields carbon dioxide and water as by products (in addition to the electricity produced). Moreover, a constant supply of methanol and oxygen (preferably from ambient air) can continuously generate electrical energy to maintain a continuous, specific power output. Thus, mobile phones, portable computers, and other portable electronic devices can be powered for extended periods of time while substantially reducing or eliminating at least some of the environmental hazards and costs associated with recycling and disposal of alkaline, Ni-MH and Li-Ion batteries.

The electrochemical reaction in a DMFC power system is a conversion of methanol and water to $CO_2$ and water. More specifically, in a DMFC, methanol, which may be in an aqueous solution, is introduced to the anode face of a protonically-conductive, electronically non-conductive membrane in the presence of a catalyst. When the fuel contacts the catalyst, hydrogen atoms from the fuel are separated from the other components of the fuel molecule. Upon closing of a circuit connecting a flow field plate of the anode chamber to a flow field plate of the cathode chamber through an external electrical load, the protons and electrons from the hydrogen atoms are separated, resulting in the protons passing through the membrane electrolyte and the electrons traveling through an external load. The protons and electrons then combine in the cathode chamber with oxygen producing water. Within the anode chamber, the carbon component of the fuel is converted by combination with water into $CO_2$, generating additional protons and electrons.

The principal electrochemical processes in a DMFC are:
Anode Reaction: $CH_3OH + H_2O = CO_2 + 6H^+ + 6e$
Cathode Reaction: $3/2 O_2 + 6H^+ + 6e^- = 2H_2O$
Net Reaction: $CH_3OH + 3/2 O_2 = CO_2 + H_2O$ The methanol in a DMFC is preferably used in an aqueous solution to reduce the effect of "methanol crossover". Methanol crossover is a phenomenon whereby methanol molecules pass from the anode side of the membrane electrolyte, through the membrane electrolyte, to the cathode side without generating electricity. Heat is also generated when the "crossed over" methanol is oxidized in the cathode chamber. Methanol crossover occurs because present membrane electrolytes are permeable (to some degree) to methanol and water.

The voltage output of a single fuel cell may not be sufficient to provide appropriate power to the desired application. Given the strict form factor limitations and increasingly demanding power requirements of portable electronic equipment, most applications require much higher voltages than what a single, typical DMFC can provide—which is on the order of 1.5 volts. For example, effective voltage for a laptop computer can be as high as 24 volts. To obtain such voltages using fuel cell technology, individual fuel cells are connected in series, typically forming a fuel cell stack.

Current fuel cell stack designs utilize a bipolar plate to decrease the size, and increase the efficiency of said assembly. Instead of two current collectors, only one plate is used with a flow field cut into each side of the plate. That is, one side of the plate is used in the anode chamber of one fuel cell, while the other side is used in the cathode chamber of an adjacent fuel cell. The single plate may also serve to assist in the distribution of fuel on one side of the plate and an oxidant preferably from ambient air on the other side of the plate.

Bipolar plates are typically made of a gas-impermeable material, to prevent intermixing among the fuel on the anode side and the oxidant on the cathode side. Introduction of oxygen into the anode chamber of a fuel cell typically diminishes the performance of the cell, and may cause the methanol to oxidize completely, without contributing to the generation of electricity within the fuel cell system.

The bipolar plate is electronically conductive such that the electrons produced at the anode on one side of the bipolar plate can be conducted through the plate where they enter the cathode on the other side of the bipolar plate. Two end-plates, one at each end of the complete stack of cells, are connected via the external circuit.

One of the problems associated with fuel cell stacks using bipolar plates is that of eliminating gaseous effluent from the anode chamber. Prior art DMFC systems address this problem via a recirculation configuration system. In such a system, a gas separator incorporated in an effluent return line is used to remove gases from anode effluent fluids. The gas separator separates carbon dioxide from the unused fuel solution and exhausts carbon dioxide.

Although prior art recirculation configurations address some of the problems of handling anode effluent (conserving unused methanol fuel and rendering the fuel supply impervious to rapid changes in power demands of the fuel cell) these systems typically incorporate discrete auxiliary equipment to do so, including but not limited to gas separators and other components that separate liquids from gases. This auxiliary equipment consumes volume and adds to the overall materials and assembly costs, rendering re-circulating DMFC systems less feasible for portable power and electronics applications. Moreover, in fuel cell stack systems, gas separators must be used to ensure the performance of the stack and the system as a whole. Thus, the cost of the fuel cell stack increases dramatically in view of such additional requirements.

Therefore, it would be desirable to provide an apparatus and method for removing anode effluent gas from a fuel cell of a fuel cell stack where liquids may be separated from gases within the stack without adding additional volume or components.

SUMMARY OF THE INVENTION

The present invention addresses the concern outlined above and presents a novel device and method for venting anode effluent gas without the use of external gas separators.

In one embodiment of the present invention, a bi-polar plate for a fuel cell stack having at least two individual fuel cells, includes an anode portion in a first fuel cell, where the anode portion includes a fuel flow field, a gas permeable membrane positioned away from the anode aspect of a membrane electrolyte of the first fuel cell and a gaseous effluent vent channel positioned adjacent the gas permeable membrane. The vent channel communicates gaseous effluent from the anode aspect of the membrane electrolyte via an outlet. The bipolar plate also includes a cathode portion in a second fuel cell, and having a flow field by which oxygen is introduced to the cathode of the fuel cell.

In another embodiment of the present invention, a fuel cell of a fuel cell stack includes an anode chamber, a cathode chamber, a proton conducting membrane electrolyte positioned between the chambers and a bi-polar plate. The bi-polar plate includes an anode portion disposed on the anode aspect of the membrane electrolyte in the anode chamber of the fuel cell. The anode portion includes a fuel flow field, a gas permeable membrane positioned away from the membrane electrolyte of the first fuel cell, and a gaseous effluent vent channel positioned immediately adjacent the gas permeable membrane. The vent channel communicates gaseous effluent from the anode side of the fuel cell to an outlet.

In another embodiment of the present invention, a fuel cell system includes a fuel cell stack including at least two fuel cells and a fuel delivery means. Each fuel cell includes an anode chamber, a cathode chamber and a membrane electrolyte positioned between the anode chamber and the cathode chamber. The system further includes a bi-polar plate. The bi-polar plate includes an anode portion disposed on the anode aspect of the membrane electrolyte in the anode chamber of a first fuel cell. The anode portion including a fuel flow field, a gas permeable membrane positioned away from an anode backing layer of a membrane electrolyte of the first fuel cell and a gaseous effluent vent channel positioned immediately adjacent the gas permeable membrane. The vent channel communicates gaseous effluent from the anode side of the fuel cell via an outlet. The bipolar plate also includes a cathode portion for functioning as a cathode in a cathode chamber of an adjacent fuel cell having a flow field by which oxygen is introduced to the cathode of the fuel cell.

In yet another embodiment of the present invention, a fuel cell stack includes at least two individual fuel cells, where adjacent fuel cells include a shared bi-polar plate shared between adjacent fuel cells and an anode side of the bi-polar plate includes a vent channel for venting gaseous effluent from the anode.

In another embodiment of the present invention, an anode plate for a fuel cell, which includes a membrane electrolyte is provided. The anode plate includes a fuel flow field having a portion thereof positioned substantially opposite the membrane electrolyte. The fuel flow field comprises a gas permeable membrane and a gaseous effluent vent channel positioned immediately adjacent the gas permeable membrane. The vent channel communicates gaseous effluent from the fuel flow field via an outlet.

In yet another embodiment, a fuel cell is provided which includes a membrane electrolyte, an anode backing layer positioned proximate the membrane electrolyte, a cathode plate forming a cathode chamber and a cathode backing layer positioned proximate the cathode plate. The cathode plate includes a flow field by which oxygen is introduced to the cathode plate. The fuel cell also includes an anode plate which forms an anode chamber. The anode plate includes a fuel flow field and a gas permeable membrane positioned away from an anode backing layer of a membrane electrolyte. The anode plate also includes a gaseous effluent vent channel positioned immediately adjacent the gas permeable membrane, for communicating gaseous effluent from the anode side of the fuel cell to an outlet.

In another embodiment of the invention, a method of removing gaseous effluents from the anode aspect of a fuel cell system is provided. The fuel cell system for this embodiment includes a membrane electrolyte, an anode chamber having a fuel flow field, a fuel delivery means, a gas permeable membrane and an outlet in communication with the gas permeable membrane. The method includes collecting the gaseous effluent at the anode chamber and communicating the collected gaseous effluent to the outlet.

The embodiments of the invention may also be used with one or more of the following features:

having the gas permeable membrane made of a first material for substantially blocking gaseous communication through the membrane and a second material for allowing gaseous communication through the membrane. The first material may include a first field of the membrane and the second material may include a second field of the membrane;

the first and second materials as outlined above may be bonded together;

the first and second materials may be mechanically affixed to one another;

the first material may include a plurality of openings, and the second material may be positioned within each of the plurality of openings;

the second material may include Zintex®;

the second material may include expanded PTFE;

the first and the second materials may be combined to substantially form a single structure;

the second material may be divided into a plurality of portions which are spaced apart along the first material;

the plurality of portions may extend substantially the width of the fuel flow field;

the plurality of portions may extend substantially the length of the fuel flow field;

the second material may include a web of micromesh, and the first material may include a plurality of strips positioned intermittently along the second material; and the first material may be separated from the second material.

The embodiments and features of the present invention will become even clearer with reference to drawings which accompany this application (briefly described below) and with reference to the detailed description of the invention which follows thereafter.

DETAILED DESCRIPTION OF THE EMBODIMENTS

Illustrative embodiments of the present invention described below provide a direct feed fuel cell system for producing electrical energy through an electrochemical oxidation/reduction of an organic fuel reactant and an oxidizing agent. More particularly, the invention may be directed to a direct feed methanol fuel cell system for producing electrical energy through the electrochemical oxidation of an organic fuel, such as methanol, and reduction of an oxidizing agent, such as air.

Those skilled in the art will appreciate, however, that embodiments in accordance with the invention are not limited to a direct feed methanol fuel cell, but, rather, may also be used in other fuel cell systems that generate electrical energy from the electrochemical oxidation/reduction of organic fuel reactants and oxidizing agents. Those skilled in the art will also recognize that the inventions disclosed herein will also may be used in a variety of systems and architectures.

Embodiments of the invention will be described with reference to FIGS. 1–4 which are presented for the purpose of illustrating embodiments and are not intended to limit the scope of the claims.

Figure 1:
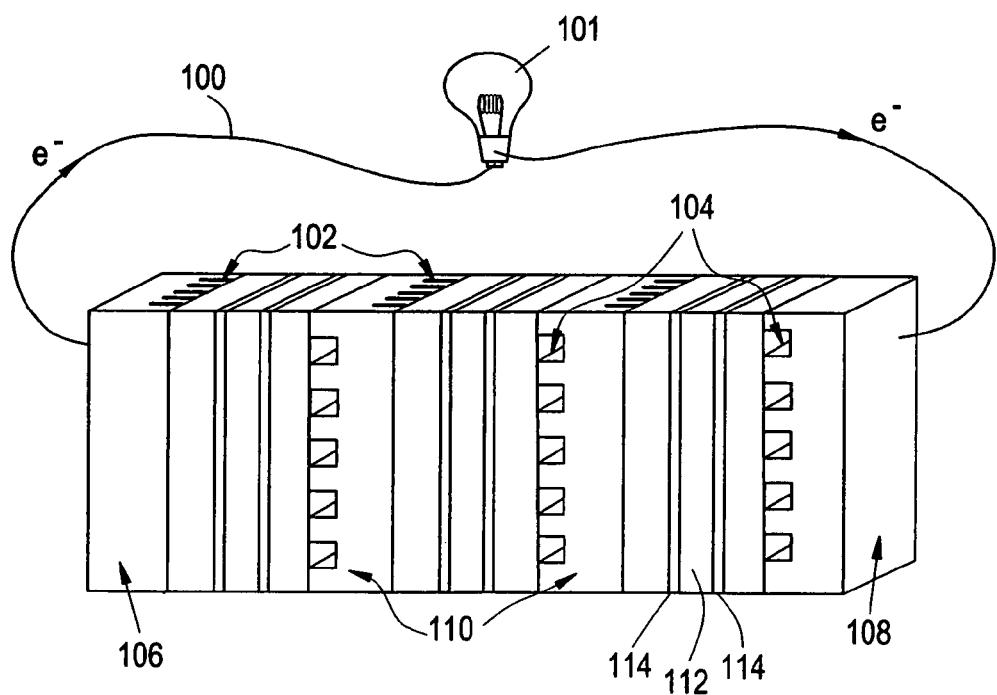
FIG. 1 illustrates a cross-sectional view of a prior art fuel cell stack, where fuel flow through the fuel channels is normal to the page.

FIG. 1 illustrates a prior art fuel cell stack 100. As shown, a plurality of fuel cells are arranged together, and include bipolar plates 110 between them. Specifically, each fuel cell of the prior art stack includes a cathode end plate 108 on one end of the fuel cell stack, and an anode plate 106 on the other end of the stack. As stated, bipolar plates are positioned between adjacent fuel cells. Each bipolar plate includes an anode side having a fuel flow field 102 and a cathode side including an air flow field 104. Each fuel cell also includes membrane electrolyte 112 is positioned between the anode plate (chamber) and the cathode plate (chamber). Diffusion layers 114 are positioned on either side of the membrane electrolyte (adjacent the anode chamber and cathode chamber) so that the membrane is adequately exposed to the fuel mixture and air. Other than the fuel and air flow fields, the fluidic management system of this stack is not shown, and may include necessary pumps, and in the prior art, would also include a means by which fuel is supplied to the stack and by which gases are separated from the anode aspect of each cell of the fuel cell stack. The fuel cell stack 100 produces electrical energy ($e^-$) for connection to an electrical load (light bulb 101).

Figure 2:
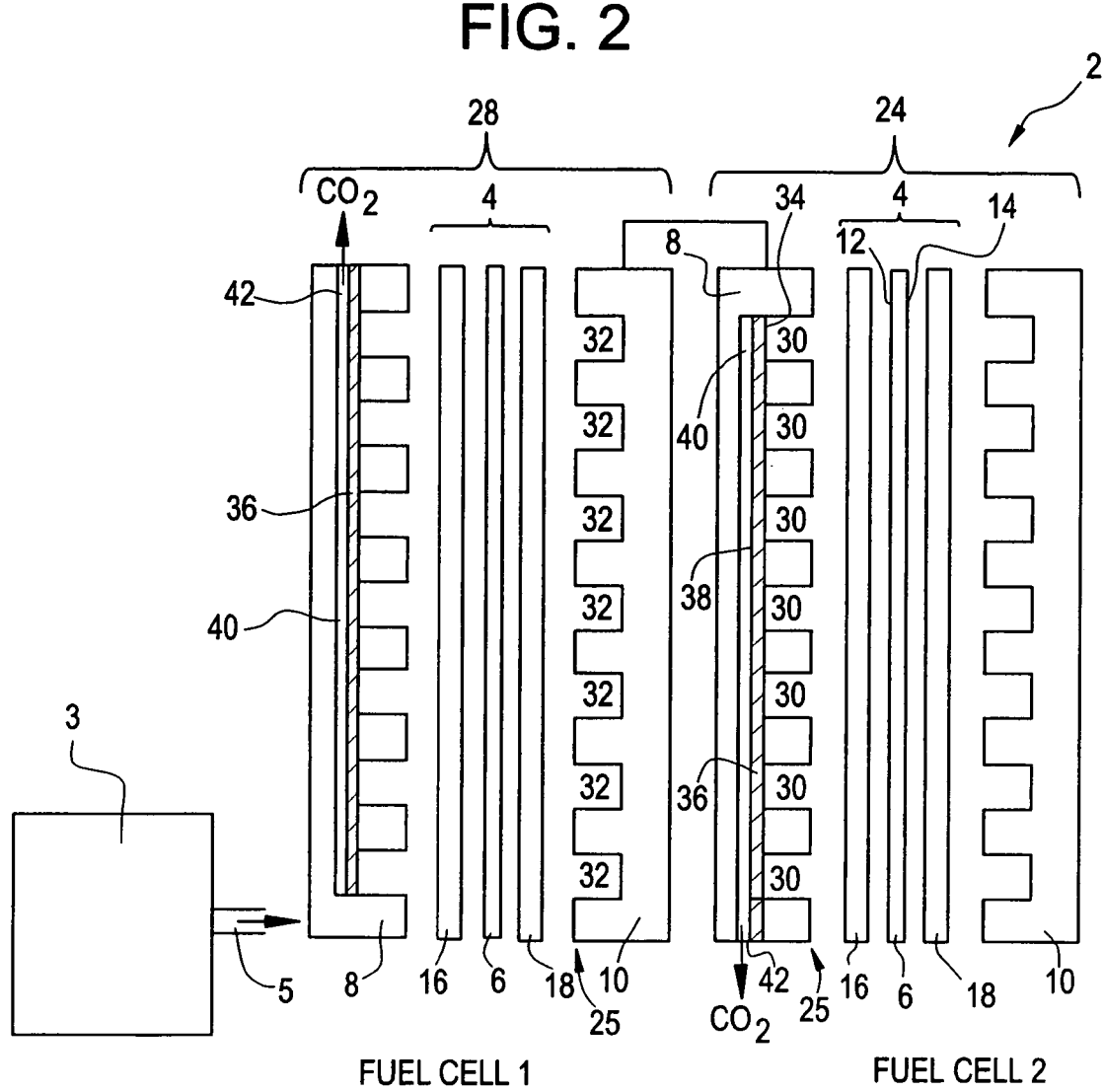
FIG. 2 illustrates the novel anode plate according to one embodiment of the present invention in a multi-fuel cell arrangement.

As shown in FIGS. 2–4, the present invention, for example, includes a direct oxidation fuel cell stack 2 which may include a plurality of fuel cells each having a membrane electrolyte assembly 4 with a proton-conducting, electronically non-conductive membrane electrolyte 6 disposed between an anode side 8 and a cathode side 10 of a corresponding fuel cell. The exact shape of the anode chamber and cathode chamber may be defined by a "flow field" which is generally integrated into the anode plate (fuel flow field) and the cathode plate (air flow field), respectively. The flow fields aid in distributing the fuel and the oxidizing agent to the membrane electrolyte. Although FIG. 2 is illustrated as a stack comprised of only two cells, any number of fuel cells can be stacked in order to achieve the desired voltage and current requirements. A fuel supply 3, which may comprise any one or more of a fuel source, a fuel cartridge, a mixing and/or storage chamber (for creating and/or storing an aqueous, for example, fuel mixture) and a pump, or any combination thereof, delivers fuel (preferably in a mixture form; e.g., aqueous solution) to the fuel flow fields. The fuel mixture may be supplied to the fuel flow fields of each fuel cell via a conduit 5 or channel, or any other means to fluid communicate the fuel mixture to the fuel flow fields.

Each surface of the membrane electrolyte 6 may be coated with electrocatalysts which may serve as anode reactive sites 12 on the anode aspect of the membrane and cathode reactive sites 14 on the cathode aspect of the membrane. The anode and cathode reactive sites facilitate the electrochemical reactions of the DMFC.

It is worth noting that the electrocatalysts may be provided in other areas within the anode and cathode chambers, and thus, the invention is not limited to fuel cells where the catalysts are provided on the membrane electrolyte.

Diffusion layers 16 and 18, may be included and positioned on either side of the membrane. These layers provide a more uniform, effective supply of methanol solution (anode diffusion layer 16) to the anode reactive sites and a more uniform, effective supply of oxidizing agent (cathode diffusion layer 18) to the cathode reactive sites. Diffusion layers 16 and 18 on each of the anode and cathode sides of the membrane electrolyte may also assist in maintaining appropriate humidification of the membrane electrolyte by assisting in the distribution and removal of water to and from the membrane electrolyte at rates that maintain a proper water balance in the DMFC power system. Moreover, each layer may be used with the fuel and air flow fields, to further aid in distributing fuel and oxidant to the respective reactive sites.

Between adjacent fuel cells in the interior of the fuel cell stack, a bipolar plate assembly 25 is provided, with an anode side 8 of the plate functioning as the anode in one fuel cell 24 and a cathode side 10 of the plate functioning as a cathode in an adjacent fuel cell 28. The bipolar plate assembly is constructed of an electrically conductive material, such as, although not limited to, a carbon composite, graphite or a number of metals, including, although not limited to, stainless steel, so that electrons can be conducted between adjacent fuel cells for connection in series.

The bipolar assembly includes a fuel flow field 30 channeled into the anode side and an oxidant flow field 32 channeled into the cathode side of the plate. The base of each channel of the fuel flow field includes a first side 34 of a gas permeable, liquid impermeable membrane 36, with the other side 38 of the membrane being in communication with a venting channel 40. The venting channel includes at least one end connected to a port 42 located on the outside of the bipolar plate. This port may be exposed to ambient air, or may be connected to another conduit which allows gases to pass from the channel, to the port, to the ambient environment, or to perform work within the fuel cell system. Those skilled in the art will recognize that the components of the bipolar plate assembly may be integrated into a single component, using molding and fabrication techniques known to those skilled in the art. It will also be appreciated by those of ordinary skill in the art that the gas-permeable membrane 36 may fill venting channel 40 up to an including port 42.

Although the novel bipolar assembly is shown as used with a compact fuel cell stack, the present invention may also be directed to a single anode plate of a first fuel cell electrically coupled to a cathode plate of a second fuel cell of a fuel cell stack, with the anode plate including a fuel flow field in association with the gas permeable, liquid impermeable membrane and the venting channel/port. Moreover, this novel arrangement of the anode plate or assembly is also appropriately used with a single fuel cell system.

Thus, the gaseous effluent produced in the fuel flow field on the anode side (or anode plate of separate or single fuel cells) of the bipolar plate pass into the channel and escape out of the fuel cell stack via the port.

Figure 3A:
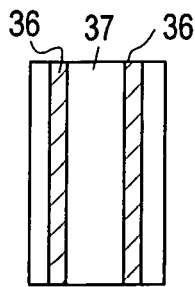
FIGS. 3A–3C illustrate various arrangements of a gas permeable membrane for use with the present invention.
Figure 3B:
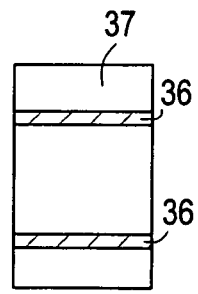
Figure 3C:
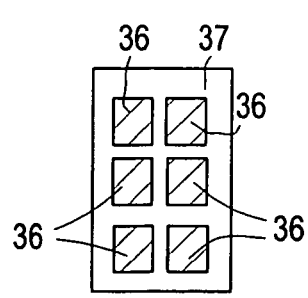

The gas permeable membrane of the fuel cell system may be comprised substantially of a gas permeable, preferably liquid impermeable material such as an expanded polyfluoroethylene or other selected expanded polymer, provided that sufficient electrical contacts with the diffusion layer are maintained. Alternatively, the membrane may be comprised of a first material, which does not communicate gas, where a second gas diffusing material is placed in predetermined patterns among the first material. Those skilled in the art will recognize that the exact pattern of the flow field plates may also contribute to the determination of the optimal pattern of gas permeable, liquid impermeable membrane in the bipolar plate or assembly, since the flow field plates are, due to the materials used to fabricate the flow field plates. Accordingly, examples of such patterns are illustrated in FIGS. 3A–3C. In FIG. 3A, "vertical" strips of gas permeable material 36 are placed in specific locations on a gas-blocking material 37. FIG. 3B illustrates a similar embodiment, but the strips 36 are positioned "horizontally" or in an irregular manner (e.g., diagonally) which allows for the substantially uniform removal of gas from each anode chamber. Patches 36 of the gas-permeable material may be patterned as that shown in FIG. 3C. Thus, using such patterns of gas permeable material, the entire area of each channel of the fuel flow field need not be exposed to the membrane. With regard to the venting channel, it need only be formed such that it is in communication with a predetermined amount of the membrane for properly ridding the anode side of gaseous effluent.

Figure 4A:
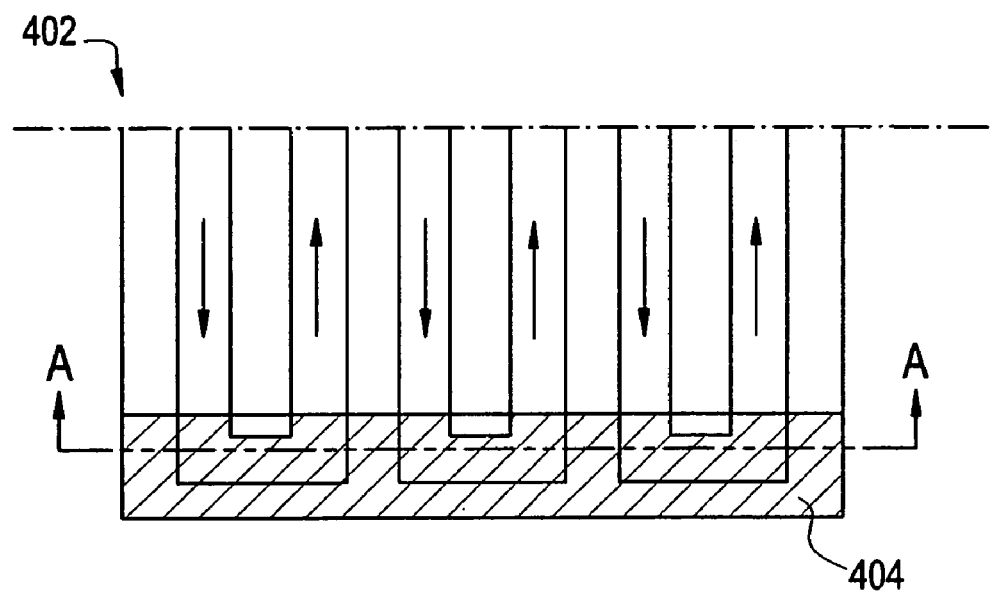
FIGS. 4A–B illustrate a portion of an exemplary anode flow field channel formed by either the anode plate of a single fuel cell, an anode-cathode (bi-polar) plate assembly for a fuel cell stack or a bipolar plate for use with a fuel cell stack according to the present invention.

Alternatively, the gas permeable, liquid impermeable material may be in direct communication with the ambient environment, or a vent which is in communication with the ambient environment. By way of example, and not limitation, FIG. 4A illustrates a top, semi-cross-sectional view (i.e., looking normal to the fuel flow field) of an anode flow field plate 402 wherein the gas permeable material 404 (cross hatching) extends from the an edge of the plate, which is directly or indirectly in communication with the ambient environment. Accordingly, the fuel solution that is passing through (arrows) the flow field channel is comprised of the fuel mixture, unreacted fuel, and gases created by the anodic half reaction. When these gasses come into contact with the gas permeable membrane, they are removed from the liquid in the flow field channel, and vented to the ambient environment.

Figure 4B:
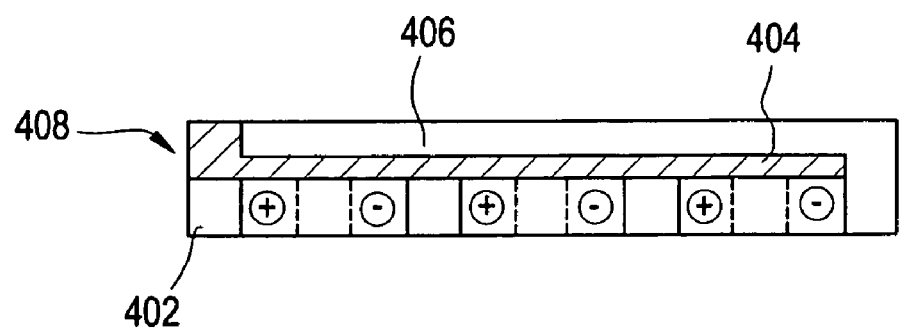

FIG. 4B shows a semi-cross sectional view of the end of the fuel flow field 402, illustrating how only a portion of the fuel flow field need be exposed to the gas permeable membrane 404 (cross hatching). In this embodiment, the gas permeable membrane is included with an effluent conduit 406, which leads the effluent to a vent 408. The fuel flow is shown with a + and − signs: flow of the fuel mixture out of the page (+) and flow of the fuel mixture into the page (−). A further advantage of such a design is that it allows adequate contact between the bipolar plate or assembly and the adjacent MEA, thus improving the performance of the stack and fuel cell system.

A novel feature of this embodiment of the invention, is the ability to customize the rate and/or profile at which anodically generated gas is removed from the flow field by altering the configuration of the gas permeable membrane with the other components of the anode plate. Specifically, the number of outlets to the ambient environment, as well as their size, shape, and pattern arrangement may be designed to allow gases to escape at varying rates and/or profiles. In addition, the design and operation of this embodiment avoids or minimizes the coalescence and/or accumulation of $CO_2$ bubbles in the anode chamber (which sometimes limit the reactions and/or the efficiency of the fuel cell). Moreover, the gas separation properties may be further customized by selecting materials for the gas permeable membrane that allow anodic gasses to escape from the system at a desired rate, and/or may allow certain gasses to pass selectively.

The gas separating second material is constructed of, although not limited to, a hydrophobic polymer having a high capacity to remove carbon dioxide from anode chamber of each fuel cell. The hydrophobic polymer of the second material may include, although is not limited to, ZINTEX®, available from W. L. Gore & Associates of Newark, Del. In some instances it may be desirable to use a material that will preferentially allow carbon dioxide to pass through it and limiting the amount of oxygen that passes through the membrane. One example of a material that preferentially allows carbon dioxide to pass while limiting the passage of oxygen, is Teflon AF, available from Biogeneral Inc., San Diego, Calif.

The gas permeable, liquid impermeable membrane may be manufactured via coextrusion, or using other methods well known to those skilled in the art. Alternatively, the apertures may be punched out of the first material with a die, and the second material added using an appropriate adhesive, or mechanically fastened or otherwise attached.

Exposing the liquid in the anode chamber with the gas permeable, liquid impermeable membrane according to the present invention limits the extent to which ambient oxygen may migrate into the anode chamber. Alternatively, other designs and profiles may be used to limit the diffusion of other ambient gases to the anode chamber from the vent and gas permeable membrane. The gas permeable portion may, regardless of the method used to manufacture, be designed to increase the ability to remove $CO_2$.

Accordingly, having thus described some of the embodiments of the invention, various alterations, modifications and improvements may readily occur to those skilled in the art. Such alterations, modifications and improvements are intended to be within the scope and spirit of the invention. Accordingly, the foregoing description is by way of example only and is not intended as limiting.

What is claimed is:

1. A method of removing gaseous effluents from the anode aspect of a fuel cell system, the fuel cell system comprising a membrane electrolyte, an anode chamber having a fuel flow field, a fuel delivery means, a gas permeable membrane and an outlet in communication with the gas permeable membrane, the method comprising:

collecting the gaseous effluent at the anode chamber;

communicating the collected gaseous effluent to said outlet via a communication channel; and adjusting a rate at which the gaseous effluent is collected at the anode chamber;

wherein adjusting comprises changing a material of the gas permeable membrane.

2. The method according to claim 1, wherein said material is changed from an original first material having a first absorption rate to a second material including a second absorption rate which is different from the first absorption rate.

3. A method of removing gaseous effluents from the anode aspect of a fuel cell system, the fuel cell system comprising a membrane electrolyte, an anode chamber having a fuel flow field, a fuel delivery means, a gas permeable membrane and an outlet in communication with the gas permeable membrane, the method comprising:

collecting the gaseous effluent at the anode chamber;

communicating the collected gaseous effluent to said outlet via a communication channel; and adjusting a rate at which the gaseous effluent is collected at the anode chamber;

wherein adjusting comprises changing a material of the gas permeable membrane;

wherein adjusting comprises including a second material with a first material of the gas permeable membrane, wherein the second material changes the overall absorption rate of the gas permeable membrane.

* * * * *